(12) United States Patent
Al-Jlil

(10) Patent No.: US 8,211,314 B1
(45) Date of Patent: Jul. 3, 2012

(54) PROCESS OF MAKING AND USING ADSORBENT TO REMOVE HEAVY METAL FROM WASTE WATER

(75) Inventor: Saad A Al-Jlil, Riyadh (SA)

(73) Assignee: King Abdulaziz City for Science and Technology "KACST", Riyadh (SA)

( * ) Notice: Subject to any disclaimer, the term of this patent is extended or adjusted under 35 U.S.C. 154(b) by 0 days.

(21) Appl. No.: 13/412,839

(22) Filed: Mar. 6, 2012

Related U.S. Application Data

(62) Division of application No. 13/091,370, filed on Apr. 21, 2011, now Pat. No. 8,147,702.

(51) Int. Cl.
*B01D 21/00* (2006.01)
*C02F 1/52* (2006.01)
*B01D 35/00* (2006.01)
*B01D 35/18* (2006.01)

(52) U.S. Cl. ........ 210/711; 210/636; 210/638; 210/662; 210/721; 210/722; 210/85; 210/175; 502/400

(58) Field of Classification Search .................. None
See application file for complete search history.

(56) References Cited

U.S. PATENT DOCUMENTS

| | | | |
|---|---|---|---|
| 4,059,513 A | 11/1977 | Zadera et al. | |
| 4,338,200 A | 7/1982 | Zeijlstra et al. | |
| 5,370,827 A | 12/1994 | Grant et al. | |
| 5,601,704 A | 2/1997 | Salem et al. | |
| 7,294,268 B2 * | 11/2007 | Yamasaki et al. | 210/601 |
| 2009/0184054 A1 | 7/2009 | Crawford et al. | |

* cited by examiner

*Primary Examiner* — Krishnan S Menon
*Assistant Examiner* — Dirk Bass
(74) *Attorney, Agent, or Firm* — Geeta Kadambi; Riddhi IP LLC

(57) ABSTRACT

The present disclosure describes using the naturally present dissolved chemicals as precipitants from local water sources to form an adsorbent and a process of purifying the water using natural resources. The adsorbent may be processed at the right pH and temperature to purify and remove heavy metals from waste water. Once the heavy metals are removed the concentration of the heavy metals are estimated in the reusable water. The local authority acceptable level heavy metal containing reusable water is reclaimed for non-human consumption. This disclosure enables to conserve water and provide a cheap and an effective method to decontaminate industrial waste water.

8 Claims, 6 Drawing Sheets

PROCESS OF MAKING AND USING ADSORBENT TO REMOVE HEAVY METAL FROM WASTE WATER

CROSS REFERENCE TO RELATED APPLICATION

This application is a divisional application and claims priority to U.S. patent application Ser. No. 13/091,370 filed on 21$^{st}$ April, 2011, now allowed. The pending U.S. application Ser. No. 13/091,370 is hereby incorporated by reference in its entireties for all of its teachings.

FIELD OF TECHNOLOGY

This disclosure relates generally to make and use an adsorbent for removing heavy metals from water, and more particularly, to a process of using the adsorbent for decontaminating and reclamation of the industrial waste water containing heavy metal.

BACKGROUND

Water is a precious resource and one of the natural elements that needs to be conserved. Many regions in the world have scare water resources and the heavy industrial use further depletes the natural resource in developed and developing countries. In countries like Saudi Arabia it is critical to manage this resource and maximize the use.

Water such as ground water, recycled and industrial waste water; have to be treated to remove undesirable and even toxic contaminants, particularly heavy metal contaminants in order to be reusable. Ground water depending on the geographical region and other factors may contain higher amount of contaminants such as heavy metals and may not be desirable for human consumption. Many industrial processes utilize aqueous solutions of heavy metals, such as lead and copper for manufacturing of batteries and electroplating solutions. The industry used contaminated water is discarded into the environment and they in turn contaminate the surrounding soil. It may be beneficial to treat the water to remove the contaminants and reuse the water to conserve water. The industrial waste water when discarded also contaminates the soil and increases the risk of many diseases by making the soil toxic.

Unfortunately, the removal of such heavy metals from the water used in these processes has proven to be not only difficult but also expensive. Prior art processes have utilized quite expensive adsorbents, such as activated carbon, activated sludge, various types of natural clays, carbon aerogels, coirpith carbon, natural zeolites, date pits and ion exchange resins.

Prior art references elude several methods and chemicals for purification of contaminants. For example, an absorptive bed, adding chemicals, reacting with gasses, automatic feedback control system for a water treatment apparatus, such as a recirculating solids contact clarifier, and a polymer etc. These methods and chemicals are added to facilitate the formation of a sludge comprising heavy metals, gypsum and calcium carbonate by changing the pH, adjusting the pH and the temperature to precipitate the contaminants. In other methods, an acid which gels to polymerize and/or precipitate the contaminant-containing silica matrix to form an easily dry and separable solid is demonstrated. (Crawford et al. US Patent application 2009/0184054, Zadera et al. U.S. Pat. No. 4,059,513, Salem et al. U.S. Pat. No. 5,601,704, McLaughlin et al. U.S. Pat. No. 5,266,210, Zeijlstra et al. U.S. Pat. No. 4,338,200, and Grant et al. U.S. Pat. No. 5,370,827).

SUMMARY

The disclosure describes a process of making and using the adsorbent for removing heavy metals from water to restore or maintain the basic life-sustaining natural elements, i.e., water and soil. More particularly a method, process and system for removing the heavy metal from industrial waste water using the adsorbent are described.

In one embodiment, water from regular sources such as well is used to make the adsorbent. In another embodiment, dissolved chemical that are present in the water are precipitated to make an adsorbent. In one embodiment, dissolved chemical present in the water is reused as an adsorbent after the water is treated in the cooling tower. In one embodiment, the volume of water of a particular measure is first cooled to a desirable temperature if the initial temperature is more than the desired temperature.

In another embodiment, the cooling of the volume of water is carried out in a large cooling water tower made for industrial scale use. The volume of water may be cooled by any means such as air cooling, spray cooling, suction fan cooling and heat exchange. The water may be cooled in a single tower or multiple towers.

In another embodiment, the water in the water tower may be aerated using regular air or oxygen to remove the precipitants. In one embodiment, the first precipitant may be precipitated by cooling the water below the initial temperature to a desirable temperature to create a waste that is a wet adsorbent.

In another embodiment, the second precipitant may be precipitated from the water by cooling and aerating to obtain the wet adsorbent. In another embodiment, the third precipitant may be oxidized using appropriate chemicals or gas, such as oxygen gas, to modify the chemical nature of the third precipitant so that it precipitates to form the wet adsorbent.

In one embodiment, the waste as a wet adsorbent is a mixture of first precipitant, second precipitant and the third precipitant and any other solid, such as silicate, is collected for further processing. In one embodiment, the further processing of the wet adsorbent is drying and crushing the dried adsorbent to specific pore diameter, specific surface area and specific pore volume.

In one embodiment, the waste as an adsorbent from the water is used to filter heavy metals from the waste water generated by different industries. In another embodiment, the adsorbent is used to purify the waste water from various sources. In one embodiment, the adsorbent is mixed with the used water that contains a heavy metal contaminant. In one embodiment, a fritted membrane is placed in the column to filter the adsorbent and the heavy metal contaminant from the used water and to collect reusable water. In one embodiment, the reusable water is tested for acceptable level of heavy metal contaminant and may be sent back to the cleaning column for a second iteration for removal of heavy metal contaminants if the levels are below local authority authorized level.

In another embodiment, the removal of heavy metal contaminants may be done in one tank or multiple tanks till desired level of heavy metal contaminant is removed from the waste water. In one embodiment, the heavy metal contaminant may be lead, copper, zinc, cadmium and combinations thereof.

In one embodiment, a process to collect water waste as a precipitate and use the precipitate as an adsorbent. In another embodiment, the adsorbent is processed to the right pore size, area and dryness to be used further to filter heavy metal contaminant from waste water. In another embodiment, the waste water is purified using the adsorbent to filter the heavy metal. In another embodiment, the waste water is tested for heavy metal contaminant level and reused for industrial purposes. In another embodiment, once the reused water has higher than accepted level of heavy metal, as authorized by local authority, it is reprocessed for removing and purifying the reused water by the adsorbent.

In one embodiment, a system is implemented to manually or automatically or in combination be used for creating an adsorbent, processed to be ready to use and used as a component to filter heavy metal contaminants from waste water. In another embodiment, the initial temperature, the flow of water in the column, the desirable temperature, the circulation of water and waste in the columns, air sparging the fritted membrane to prevent clogging by heavy metal contaminants and adsorbents, testing the level of remaining heavy metal contaminants in the reusable water, recirculating the waste water, reusable water and water in several tanks for treatment.

The methods, systems, and processes disclosed herein may be implemented in any means for achieving various aspects, and may be executed manually or automated using a computer. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

In the instant disclosure several methods, processes and system for making the adsorbent, purifying the waste water as reusable water using the adsorbent are disclosed. Although the present embodiments have been described with reference to specific example embodiments, it will be evident that various modifications and changes may be made to these embodiments without departing from the broader spirit and scope of the various embodiments. The instant application discloses the method, process and a system that materially enhances the quality of the environment of mankind by contributing to the restoration or maintenance of the basic life-sustaining natural elements, i.e., water and soil. The instant disclosure illustrates with example after removal of heavy metal the reclamation of industrial waste water for other purposes, hence helping in restoration and reuse of natural resource such as water. The instant disclosure also illustrates that industrial waste water when disposed may contaminate the soil. Hence by removing the contaminants the instant disclosure helps preserve the soil and materially enhance the quality of the environment by contributing to the restoration of one of the basic life-sustaining natural elements, e.g., soil and water.

Figure 1:
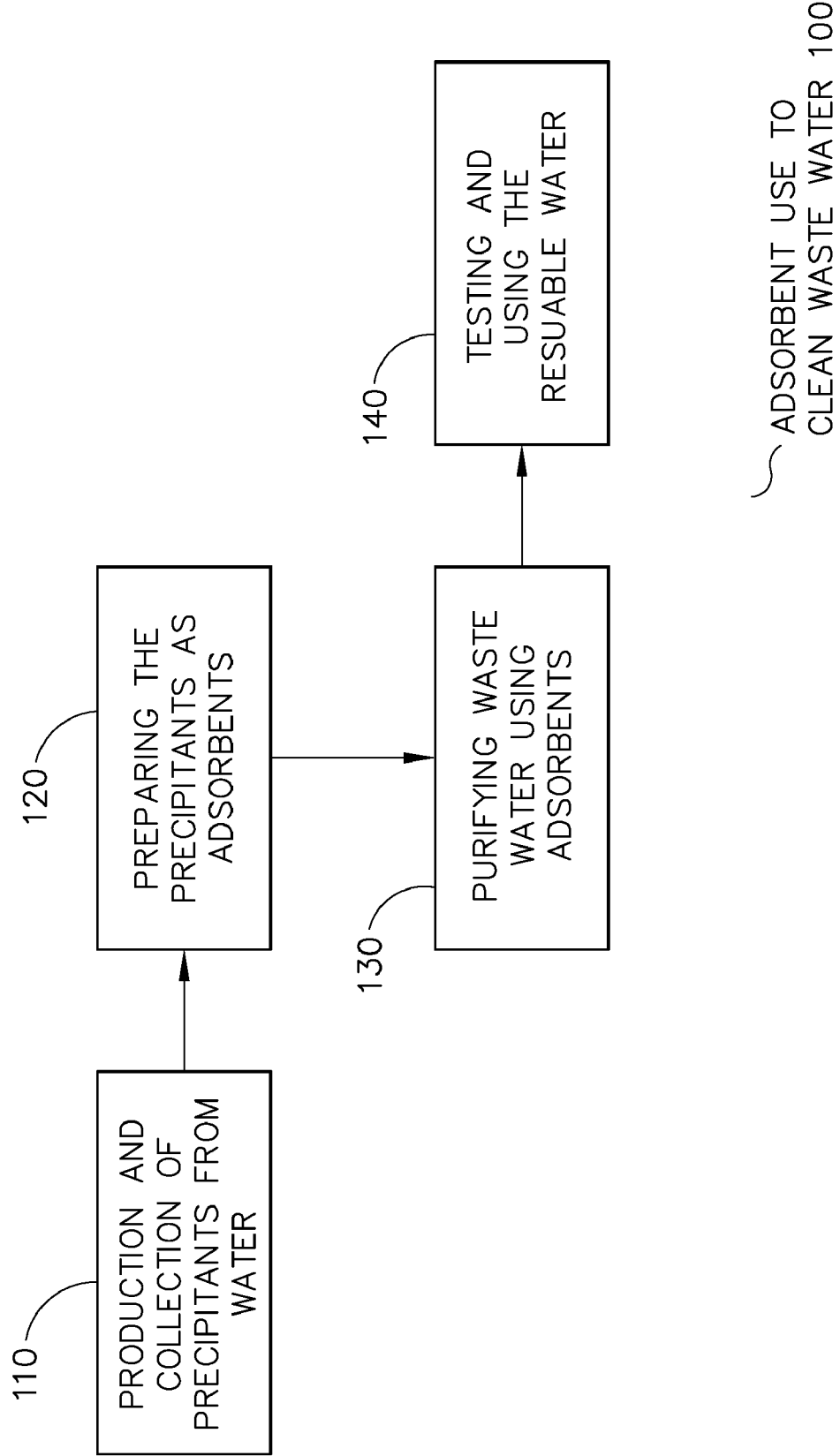
FIG. 1 is a schematic diagram of the method of making the adsorbent to be used to clean waste water 100.

The following disclosure illustrates several embodiments in detail. A relatively inexpensive but highly effective adsorbent composition for removal of heavy metal contaminants from used water is needed. FIG. 1 shows a production and collection of precipitant from water 110. After the 110 step is performed preparing the precipitant as adsorbent 120. Waste water purification using the adsorbent 130 is performed and subsequently testing and using the reusable water 140 is performed. The entire process of adsorbent use to clean waste water 100 is described in detail as section below.

Figure 2:
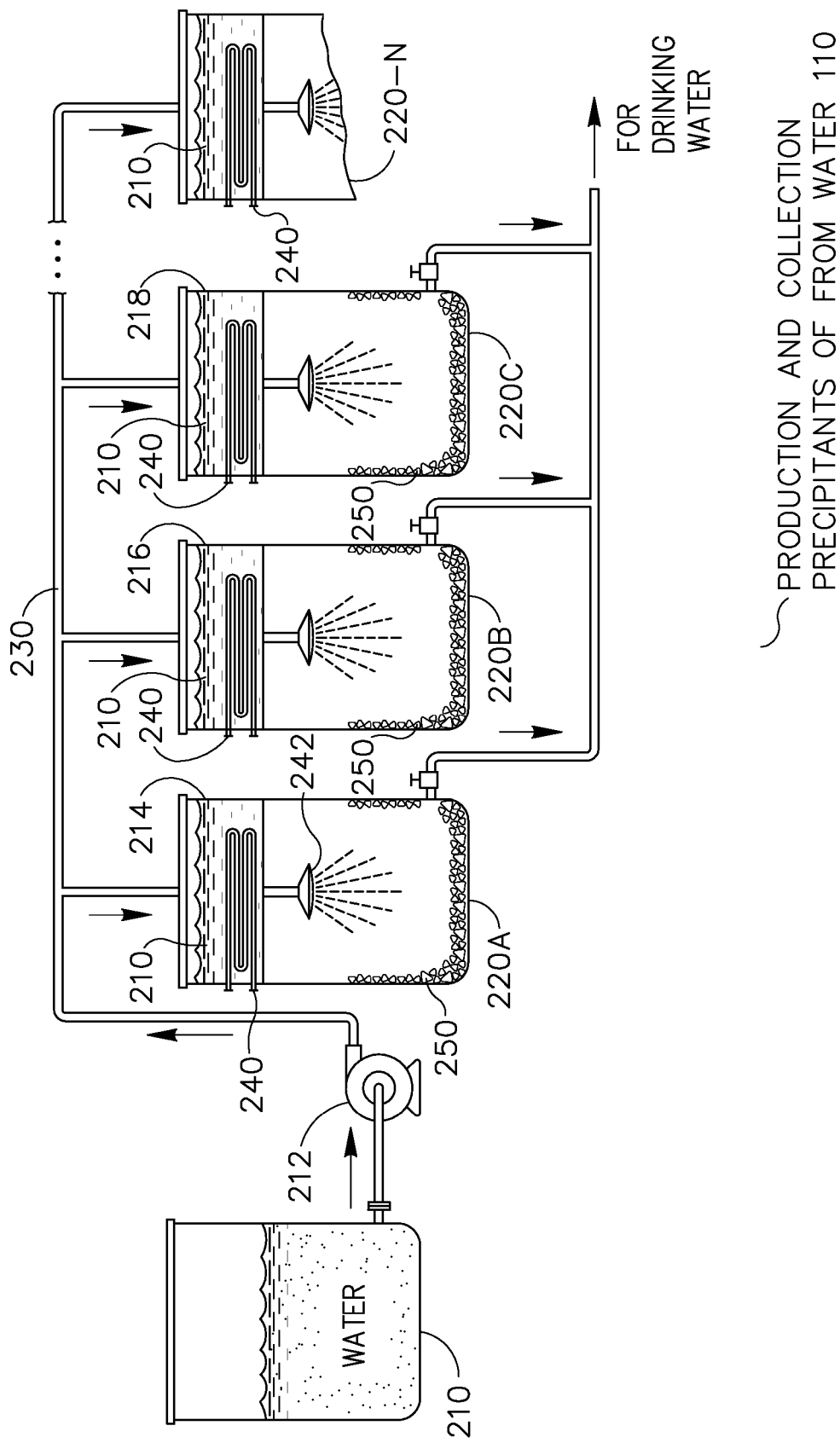
FIG. 2 shows a diagram of the method of production and collection of precipitants from water 110.

FIG. 2 shows production and collection of precipitant from water 110 is disclosed. Usually the deep water well water 210 is hot having a temperature of about 60° C. and a pH of 7.88. The volume of water has to be cooled in the water cooling tower. The water is pumped using a pump 212 into these cooling towers 220 A-N from the top. The water 210 in this embodiment may be collected in tanks 214, 216, 218 and so on before entering the water towers 220 A-N. Heat exchanger 240 in this embodiment as shown in FIG. 2 is used for cooling the volume of water contained in 214, 216 and 218 etc before it is air cooled using spray 242. However, suction fan or any other equipment that reduces the water temperature may be used in this method. The disbursement of the water may be performed in the form of a spray 242, cascade on horizontal barriers, and fall slowly as droplets to cool the water. Air is pumped via aeration process for cooling and reacting to change the dissolved chemicals. The heat exchanger 240, during heat exchange process, may cool the water down as well. The temperature of the water is reduced to 30° C. The cooling towers have the capacity to cool $150^{m3}$ $hr^{-1}$. There may be a series of these cooling towers or a single cooling tower depending on the capacity of the water that needs to be cooled. Generally, the deep well waters contain various types dissolved chemicals such as salts and salt ions such as iron (Fe), manganese (Mn), calcium (Ca) and magnesium (Mg) salts including other solids such as the silica from aquifer rocks as waste. These dissolved chemicals in water as a waste can be precipitated from water to be used as adsorbent.

One of the primary dissolved chemical as waste in well water may be in the form of salt. For example, well water has calcium bicarbonate and calcium sulfates as dissolved chemicals. Calcium bicarbonate changes to calcium carbonate at temperature above 50° C. which precipitates while carbon dioxide is liberated and the calcium carbonate forms a waste 250. This may be considered as a first precipitant.

Calcium carbonate is known as alkaline waste. The following reactions occur upon cooling the well water:

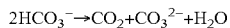

$$2HCO_3^- \rightarrow CO_2 + CO_3^{2-} + H_2O$$

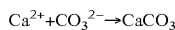

$$Ca^{2+} + CO_3^{2-} \rightarrow CaCO_3$$

The other important type of precipitant in well water is the calcium sulfate. There are three formulae of calcium sulfate which is present in water. For e.g.: Anhydrite $CaSO_4$, hemihydrate $CaSO_4.½ H_2O$ and dihydrate $CaSO_4.2H_2O$ (gypsum). The anhydrite may form a precipitate above 40° C. due to its lower solubility.

Another precipitant such as manganese is oxidized and converted to deposit on the cooling towers as a waste 250. This may be considered as a second precipitant. During the aeration and cooling step, the iron and manganese salts are precipitated in the cooling towers after reaching state of equilibrium thus making the waste 250. The process of Fe conversion takes place as follows. 1): The dissolved oxygen in the water is used to get rid of iron salts through oxidation of iron salts in the form of ferrous salts ($Fe^{+2}$) and converted to ferric salts ($Fe^{+3}$) which is then precipitated in the cooling towers 220 A-N. This may be considered as a third precipitant. Since the water purification is a continuous process it results in the production of large amounts of this solid material as waste 250. This waste as wet adsorbent 250 is deposited on the cooling towers which must be removed and collected from the cooling towers to be used as adsorbent.

As shown in FIG. 2 large amount of this solid material as waste as wet adsorbent 250 is deposited on the cooling towers 220 A-N and these precipitants must be removed and collected from the towers. The waste is currently discarded and not used. The aim of the present disclosure is to use this solid waste material as a new adsorbent to remove heavy metals from industrial waste water. Thereby converting this solid waste material to a useful adsorbent for adsorption of the heavy metals from industrial waste water is a novel idea. The solid waste material is collected as wet adsorbent 250.

Figure 3:
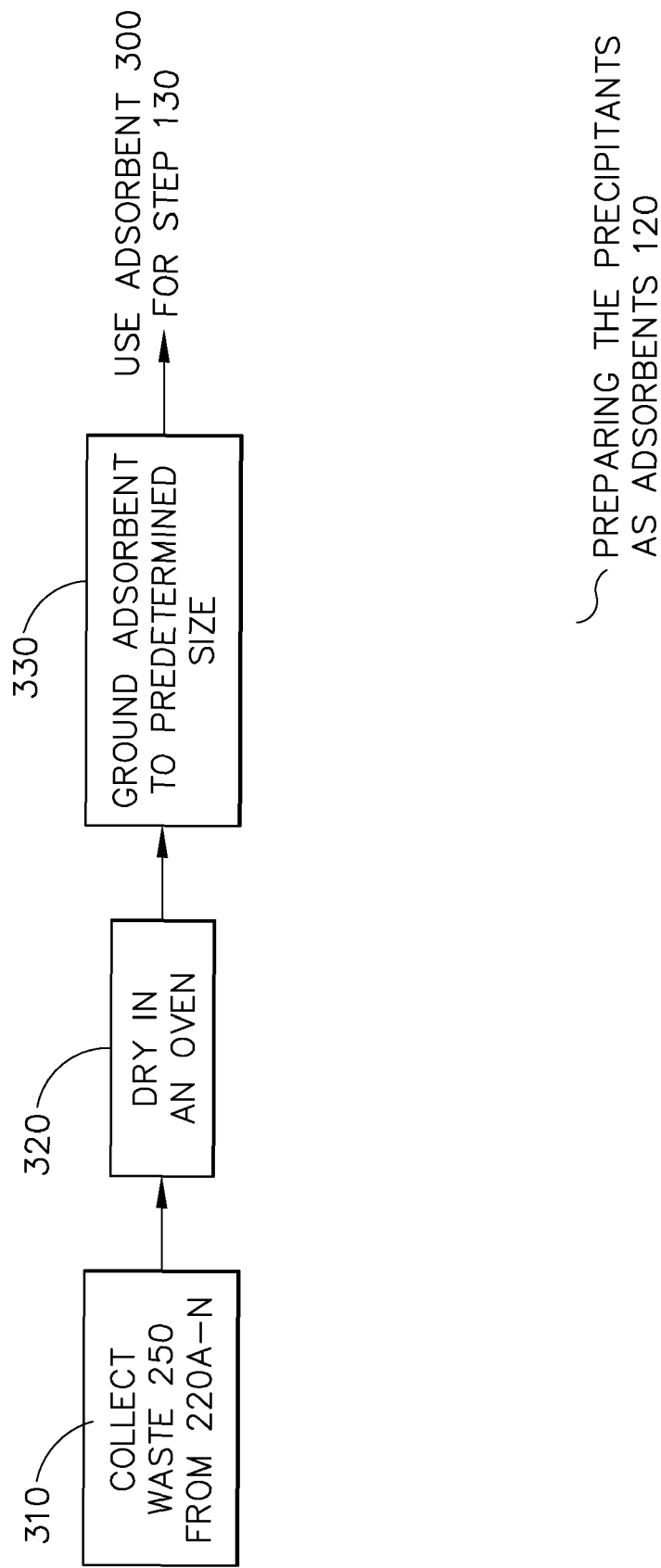
FIG. 3 shows a schematic view of the method of preparing the precipitants as adsorbent 120.

FIG. 3 describes the steps followed after the wet adsorbent from FIG. 2 is collected and further processed. The water may be cooled in the cooling tanks by using heat exchange, spray dispersion and/or cooling the water tanks to reduce the water temperature to the desired temperature level. Waste material as a wet adsorbent 250 is at least one of ferric oxide, manganese oxide, calcium oxide and silicate and a combination thereof. The wet adsorbent 250 is collected 310, dried in an oven 320 at 105° C. to remove moisture. The dried adsorbent material is optimized in size by grinding and/or crushing 330 using mechanical devices to crushing, pulverizing and/or grinding. The dried adsorbent is also optimized by grinding and/or crushing 330 into particulate having a BET surface area of about 25-26 $m^2/g$ (more specifically 25.97 $m^2/g$), a cumulative pore volume of about 0.02-0.03 $cm^3/g$ (more specifically 0.0233 $cm^3/g$) which is calculated by the BJH adsorption method, and an average pore diameter of about 70-71 angstroms (more specifically 70.634 angstroms) as calculated by the BJH adsorption method. The now dried adsorbent 250 is converted to an adsorbent for purifying contaminated water. The temperature may be monitored through the entire process. The entire process may be monitored manually or automatically and recorded for future use of quality control and quality assurance.

The ground adsorbent is used for the removal of heavy metal ions, such as Cu and Pb, from industrial waste water to obtain clean reusable water for non-human use such as the development of landscape and industrial cooling. It has been observed that up to 99.99%, even up to 100% of these metals can be removed with this technology, which is much less expensive as compared to other conventional technologies used for waste water treatment for the removal of heavy metals. The heavy metals removed from such a process may be reused for industrial purposes as well. The solid waste material obtained from this process can be used for different industrial use.

Figure 4:
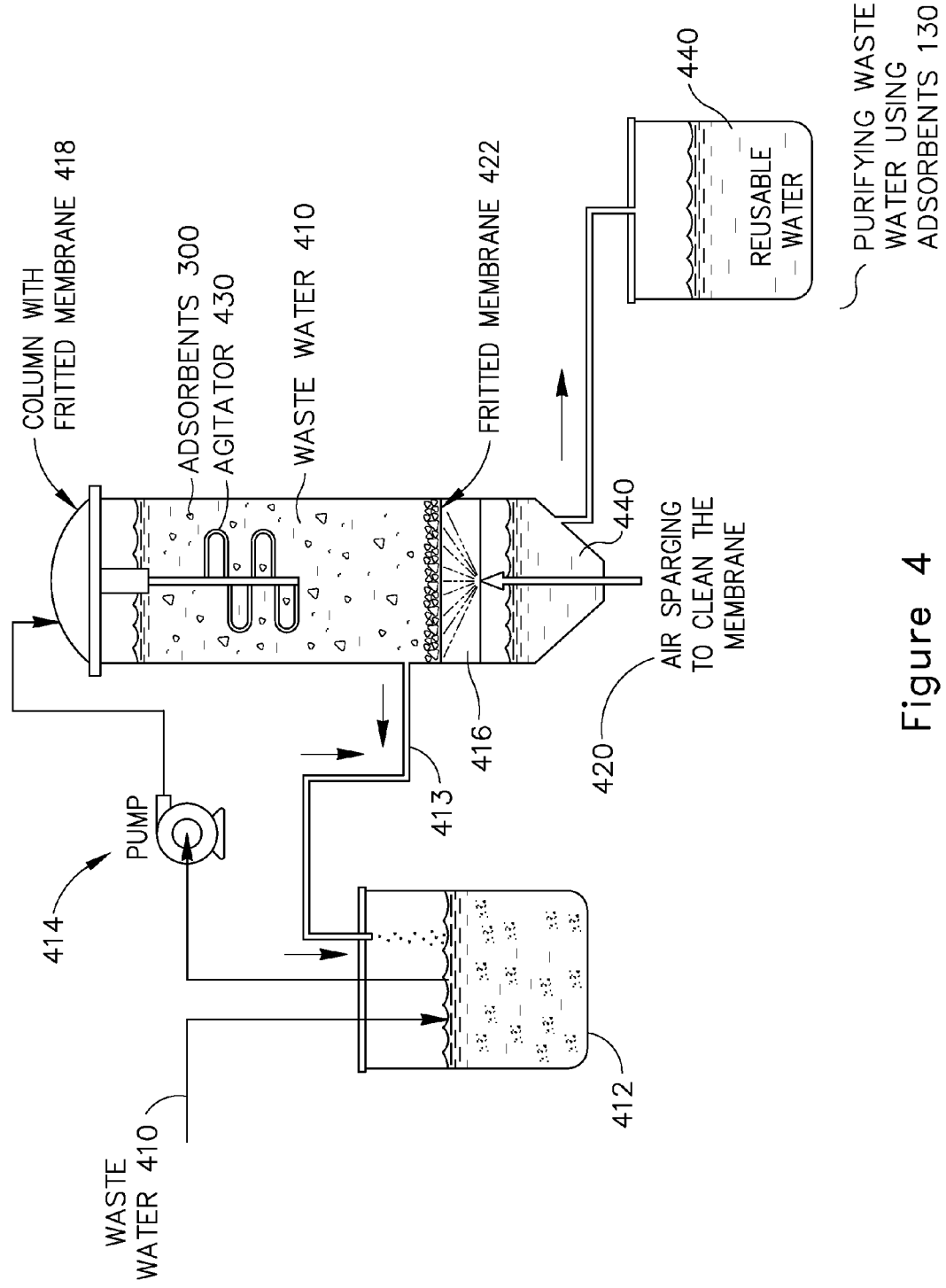
FIG. 4 shows a method of purifying waste water using adsorbent 130.

FIG. 4 shows a continuous process of producing reusable water by mixing the adsorbent 300 and waste water from industries. Recycling metal ions adsorption system which consists of main tank 412 with a pump for simultaneous recirculation and mixing the adsorbent material with heavy metal ion solution. Agitators 430 like devices may be used for uniform mixing of the waste water and adsorbent. This process may ensure total contact of adsorbents and heavy metals present in waste water. The waste water 410 may also be passed over a fritted membrane 422 is fixed in a column for purification of waste water by removing heavy metal ions and to separate the residual adsorbent material from the mixed effluent intended for purification. Purified water is continuously collected as reusable water 440 in a clean tank. In addition, air spargers 420 are used frequently for back wash and clean the fritted membrane surface from the deposition of the adsorbent and move it back to the tank.

The fritted membrane 422 is used in the present examples is a Bibby sterilin, 65 mm Pyrex® sintered disc, with porosity 12.28% (grade No. 5) and pore index between 4 microns and 10 microns (Bibby sterilin Ltd stone, Staffs, St 15 OSA, England). Pyrex® borosilicate glass disc membranes have good chemical and thermal characteristics. Pyrex® borosilicate glass has chemical properties to resist activities from acids, halogens, salt solutions and organic solvents. Pyrex® has good thermal properties as a result of its low expansion coefficient and high softening point.

The fritted membranes 422 also may comprise of other materials, for example ceramic materials, such as alumina, silica or the like in combination with a binder, or even from other glasses, so long as the final fritted membrane has a porosity close that of those disclosed above.

The main advantages of this disclosure is to remove the hazardous metals from the waste effluents from different industries and renders it suitable for landscape irrigation or recycling in the same industrial units for cooling purposes. Also if the reusable water 440 is intended for land disposal, the associated environmental hazards will be minimized. In addition, another advantage of this invention is that the adsorbent is very inexpensive, but unusually and unexpectedly effective in removing heavy metals from industrial wastewater. The removal method is effective in removing heavy metals including lead, chromium, copper, zinc, cadmium and combinations thereof. We have found that heavy metal contamination industrial wastewater is reduced by more than about 99.9%, even as much as about 100%.

Figure 5:
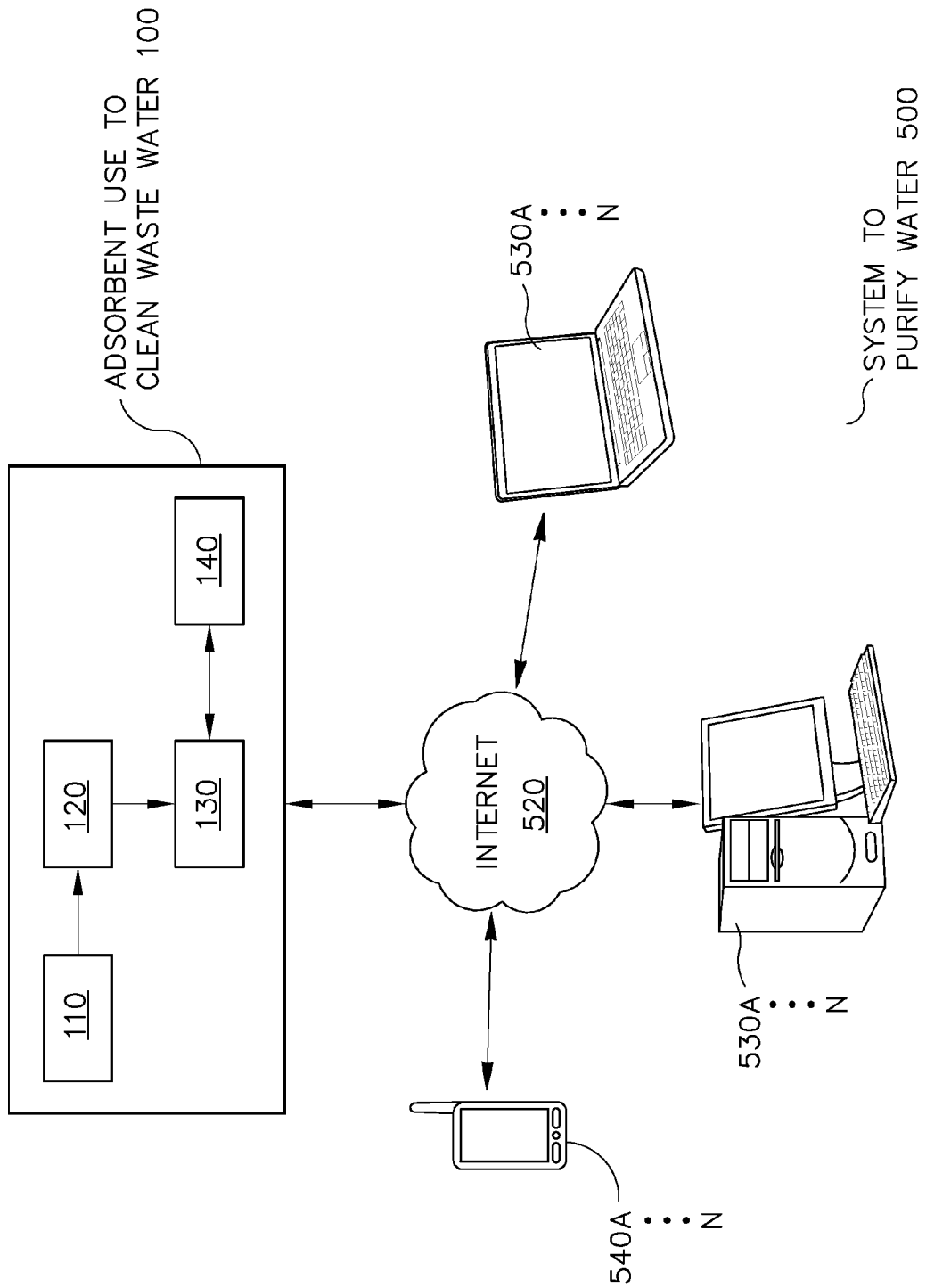
FIG. 5 shows a system to manually or automatically control the water purification process.

FIG. 5 shows a computer controlled system to purify water 500. Large scale water purification systems may be installed for a whole city or multiple cities and may be controlled using internet 520. The adsorbent use to clean waste water 100 may be controlled using electronic control systems that may be programmed as an enterprise software system. The electronic devices such computer 540 A-N and mobile devices 540 may be used either remotely or locally to control and maintain the water purification system. The parameters may be adjusted to suit the local authority requirements and authorized limits. The software may be programmed to even suit the national and global requirement limits. The system may be programmed and controlled for all the methods and steps as illustrated in FIGS. 1 to 4. The system may also be modified to be used manually or automatically or a combinations thereof.

Figure 6:
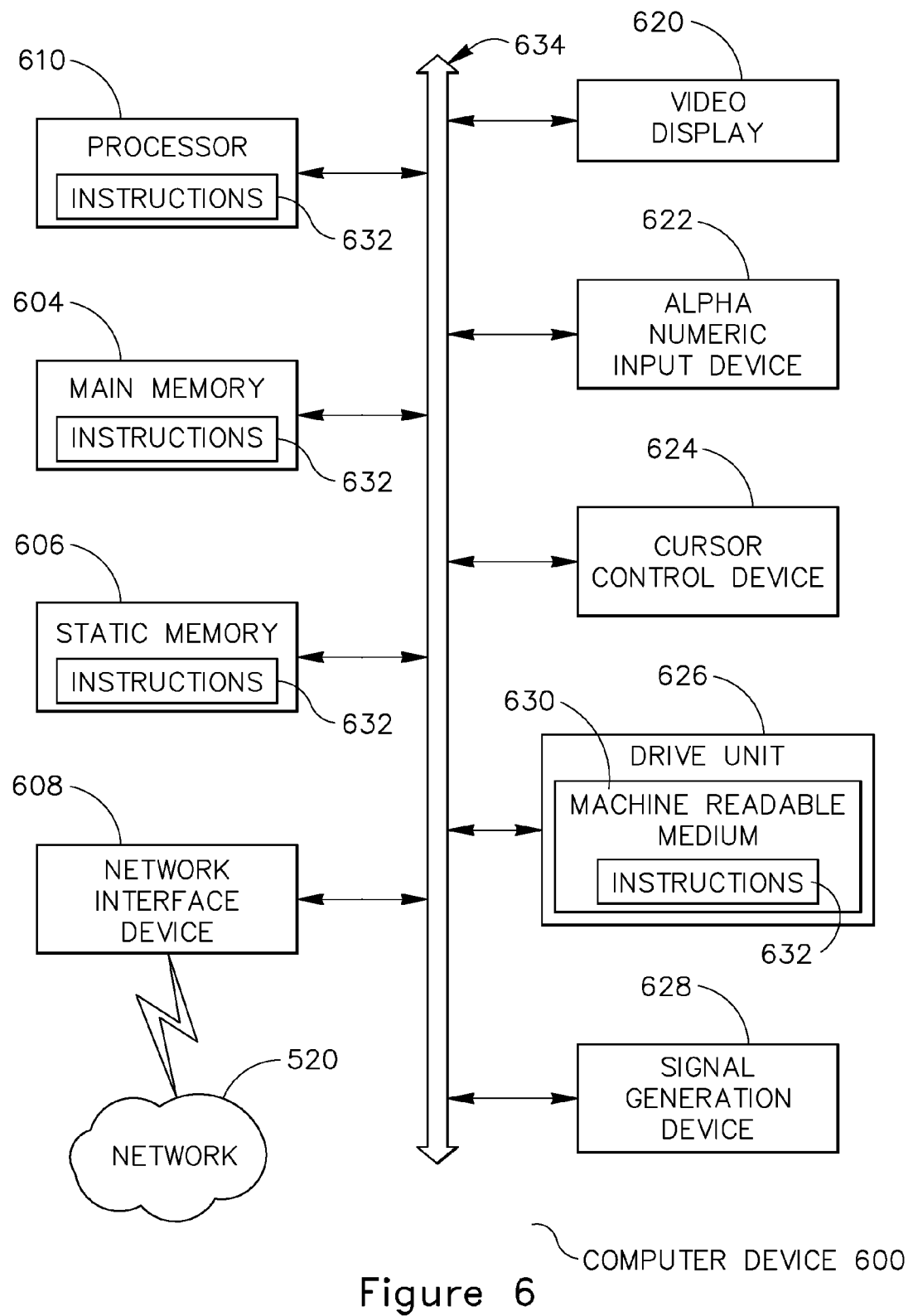
FIG. 6 is a diagrammatic system view of a computer device view in which any of the embodiments disclosed herein may be performed, according to one embodiment.

FIG. 6 is a diagrammatic system view 600 of a computer device view in which any of the embodiments disclosed herein may be performed, according to one embodiment. Particularly, the computer system view 600 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624, and a network 626, according to one embodiment.

The computer system view 600 may indicate a personal computer and/or a data processing system (e.g., server) in which one or more operations disclosed herein are performed. The processor 602 may be microprocessor, a state machine, an application specific integrated circuit, a field programmable gate array, etc. The main memory 604 may be a dynamic random access memory and/or a primary memory of a computer system. The static memory 606 may be a hard drive, a flash drive, and/or other memory information associated with the computer system. The bus 608 may be an interconnection between various circuits and/or structures of the computer system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem. The signal generation device 618 may be a bios and/or a functional operating system of the data processing system. The network interface device 620 may be a device that may perform interface functions such as code conversion, protocol conversion and/or buffering required for communication to and from a network (e.g., the network 520 of FIG. 5). The machine readable medium 622 may provide instructions on which any of the methods disclosed herein may be performed. The instructions 624 may provide source code and/or data code to the processor 602 to enable any one/or more operations disclosed herein.

Preparation of Adsorbent

The well water 210 is pumped 212 into a cooler 220 A-N and aerated, which results in precipitation of ferric oxide, Mn, Ca salts and silicate as shown in Table 1 as adsorbents 360. The pH for the solid material is 7.1. The percentage of Fe precipitated in the cooling tower is 22.398%. The reusable water is then passed to the next steps in water treatment plant.

TABLE 1

Chemical analysis of the solid material by XRF (wt %)

| Precipitants | wt % in solid material |
|---|---|
| $SiO_2$ | 18.284 |
| CaO | 53.799 |
| MnO | 5.519 |
| $Fe_2O_3$ | 22.398 |

Example 1

Contaminated waste water from a battery manufacturing process that was measured as having a concentration of lead (Pb) ions of about 100 mg/L. The waste water from the battery manufacturing plant was mixed with adsorbent 300 in a continuous process as illustrated in FIG. 4, at a temperature of about 30° C. and at pH between about 4-4.5. The water was passed through the fritted filter and contaminant level was measured. After 30 minutes of treatment the collected reusable water was analyzed for the level of contaminants present. The level of lead (Pb) ions was found to be 0 mg/L of Pb ions. This example shows 100% removal efficiency of the contaminant by the adsorbent.

Example 2

Contaminated waste water from a battery manufacturing process that was measured as having a concentration of lead (Pb) ions of about 500 mg/L. The waste water from the battery manufacturing plant was mixed with adsorbent in a continuous process as illustrated in FIG. 4, at a temperature of about 30° C. and at pH between about 4-4.5. The water was passed through the fritted filter and contaminant level was measured. After 30 minutes of treatment the collected reusable water was analyzed for the level of contaminants present. The level of Pb ions was found to be 0 mg/L of Pb ions. This example shows 100% removal efficiency of the contaminant by the adsorbent.

Example 3

Contaminated waste water from a battery manufacturing process that was measured as having a concentration of lead (Pb) ions of about 980 mg/L. The waste water from the battery manufacturing plant was mixed with adsorbent in a continuous process as illustrated in FIG. 4, at a temperature of about 30° C. and at pH between about 4-4.5. The water was passed through the fritted filter and contaminant level was measured. After 30 minutes of treatment the collected reusable water was analyzed for the level of contaminants present. The level of Pb ions was found to be 0 mg/L of Pb ions. This example shows 100% removal efficiency of the contaminant by the adsorbent.

Example 4

Contaminated waste water from a battery manufacturing process that was measured as having a concentration of lead (Pb) ions of about 2670 mg/L. The waste water from the battery manufacturing plant was mixed with adsorbent in a continuous process as illustrated in FIG. 4, at a temperature of about 30° C. and at pH between about 4-4.5. The water was passed through the fritted filter and contaminant level was measured. After 240 minutes of treatment the collected reusable water was analyzed for the level of contaminants present. The level of Pb ions was found to be 2.7 mg/L. This example shows 99.9% removal efficiency of the contaminant by the adsorbent.

Example 5

Contaminated waste water from a copper electroplating bath was measured and found to be containing 980 mg/L of Copper (Cu). The waste water from the electroplating bath was mixed with adsorbent in a continuous process as illustrated in FIG. 4, at a temperature of about 30° C. and at pH between about 4-4.5. After 240 minutes of treatment the collected reusable water was analyzed for the level of contaminants present. The level of Cu was found to be 15 mg/L. This example shows 98.5% removal efficiency of the contaminant by the adsorbent.

Example 6

Contaminated waste water from a copper electroplating bath was measured and found to be containing 3060 mg/L of Copper (Cu). The waste water from the electroplating bath was mixed with adsorbent in a continuous process as illustrated in FIG. 4, at a temperature of about 30° C. and at pH between about 4-4.5. After 350 minutes of treatment the collected reusable water was analyzed for the level of contaminants present. The level of Cu was found to be 18 mg/L. This example shows 99.4% removal efficiency of the contaminant by the adsorbent.

Example 7

A multi-component mixture of heavy metals solution from an industrial waste water, in Riyadh City, Saudi Arabia, was used that had a concentration of chromium (Cr) ions of about 169 µg/L, and aluminum (Al) ions of about 3.7 µg/L, and molybdenum (Mo) ions of about 7.2 µg/L. The waste water from the industrial waste water was mixed with adsorbent in a continuous process as illustrated in FIG. 4, at a temperature of about 30° C. and at pH between about 6-7.5. After 4 hours of treatment the reusable water was analyzed for the level of contaminants present. The level of contaminant were found to be 45 µg/L of Cr (73.4% removal efficiency), 0 µg/L of Al (100% removal efficiency), and 0.5 µg/L of Mo (93.1% removal efficiency) ions. This example clearly illustrates the efficiency of this method, system and the adsorbent to be effective in removal of the contaminants from waste water.

Example 8

A multi-component mixture of heavy metals solution from sewage waste water, Riyadh City, Saudi Arabia, that contained concentration of manganese (Mn) ions about 4.22 µg/L and iron (Fe) ions 14 µg/L. The waste water from the industrial waste water was mixed with adsorbent in a continuous process as illustrated in FIG. 4, at a temperature of about 30° C. and at pH 7.5. After a 4 hours of treatment the reusable water was analyzed for the level of contaminants present. It was found to contain 0.3 µg/L of Mn, (92.9% removal efficiency) and 1.2 µg/L of Fe (91.43% removal efficiency). This example also clearly illustrates the efficiency of this method, system and the adsorbent to be effective in removal of the contaminants from waste water.

The foregoing examples have been provided for the purpose of explanation and should not be construed as limiting the present disclosure. While the present disclosure has been described with reference to an exemplary embodiment, changes may be made within the purview of the appended claims, without departing from the scope and spirit of the present disclosure in its aspects. Also, although the present disclosure has been described herein with reference to particular materials and embodiments, the present disclosure is not intended to be limited to the particulars disclosed herein; rather, the present disclosure extends to all functionally equivalent structures, methods and uses, such as are within the scope of the instant claims. Accordingly, the specification and drawings are to be regarded in an illustrative rather than in a restrictive sense.

What is claimed is:

1. A process comprising:
   Estimating a content of a dissolved chemical in water from a deep water well;
   Precipitating and drying the dissolved chemical to form a dry waste;
   Adjusting the pH, specific surface area, and specific pore diameter of the dry waste to form an adsorbent;
   Identifying a heavy metal contaminant level, concentration, and pH in a waste water;
   Mixing the formed adsorbent and the waste water to remove heavy metals from the waste water; and
   Filtering the waste water with a fritter membrane to form reusable water.

2. The process of claim 1, wherein the dissolved chemical is at least one of ferric oxide, calcium oxide, silicate and manganese oxide.

3. The process of claim 1, further comprising;
   Monitoring the temperature and pH of the adsorbent and the waste water after mixing;
   Cleaning the fritter membrane to unclog so that filtering of the waste water to form reusable water is done efficiently; and
   Adjusting the mixture to optimize the condition by at least one of manually and automatically.

4. The process of claim 3, wherein the temperature is 25° C.-35° C.

5. The process of claim 3, further comprising:
   automatically monitoring, controlling and recording a data produced at every step of the method of producing the reusable water.

6. The process of claim 1, wherein the pH is between 4 and 7.5.

7. The process of claim 1, wherein the specific pore diameter is between 70-71 angstroms.

8. The process of claim 1, wherein the specific surface area is between 25-26 m$^2$/g.

* * * * *